Jan. 27, 1948.  I. A. MITCHELL  2,435,149
EDUCATIONAL TOY
Filed Sept. 12, 1944
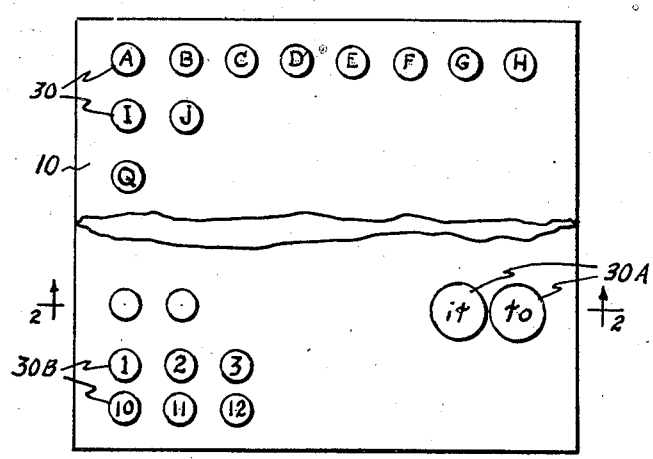
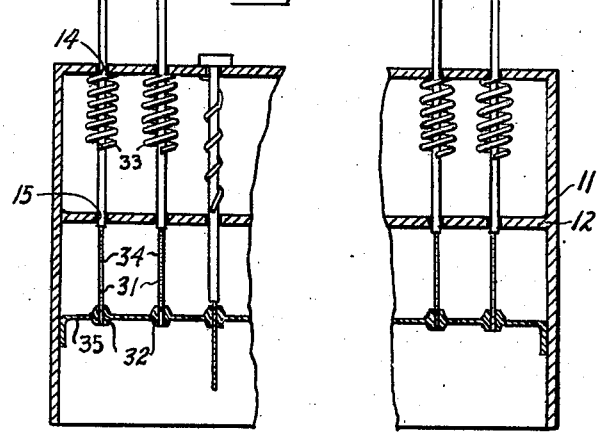
INVENTOR
ISSAC ALLEN MITCHELL
BY Howard T. Jeandron
ATTORNEY Patented Jan. 27, 1948

2,435,149

UNITED STATES PATENT OFFICE 2,435,149

EDUCATIONAL TOY

Issac Allen Mitchell, Neponsit, Long Island, N. Y.

Application September 12, 1944, Serial No. 553,712

3 Claims. (Cl. 35—35)

This invention relates to educational acoustical toys and instruction devices, and more particularly to a device in which a character or word is indicated visually and in which the sound corresponding to the visual indication may be reproduced.

In the past, educational devices have been employed in various forms such as in letter blocks and letter cards, but in all such cases, it has been necessary for a teacher to instruct in the sound formation of such letter. For more elaborate purposes of instruction through the use of sight and sound, sound on film has been employed. However, this method does not lend itself to any simple or inexpensive applications.

The object of this invention is to provide a device in which a sound groove is associated with each letter or word, having a sound reproducer that may be drawn over this sound groove to produce the equivalent sound.

A further object of this invention is to produce a device in which a sound track is associated with each letter or word, and arranged so that the sound track may be moved with relationship to a mechanical sound reproducer to produce the equivalent sound of the character with which it is associated.

A still further object of this invention is to employ a mechanical manually operated reproducer for reproducing a desired word, sound or character in the teaching of languages.

Other objects of this invention will be apparent by reference to the accompanying drawings and detailed description in which like reference numerals are applied to like parts in the several figures, and in which:

Figure 1 illustrates a plan view of an alphabet board in which the sound keys have been mounted, Figure 2 illustrates a cross sectional view of the alphabet board taken on line 2—2 of Fig. 1.

In the embodiment of the invention illustrated in Figs. 1 and 2, there is shown a board 10 having a plurality of alphabet button keys 30, numeral button keys 30B, and words or other symbol button keys 30A mounted thereon.

The board 10, as illustrated in Fig. 2, is supported by a box like structure 11 with a cross supporting wall 12. The keys 30, 30A and 30B are mounted through aligned apertures 14, 15 in the board 10 and wall 12 respectively. An extended wire portion 34 of each key projects through a close fitting aperture 32 in an acoustical diaphragm 35.

In Figure 2, the indicia are indicated at the ends of buttons 30 such as employed on a typewriter with a corresponding sound track 31 embossed on the associated wire 34 with spring means 33 for return of the button to the extended position. When the button is depressed, the sound track 31 is moved and the said track is engaged with the close fitting aperture 32 in the acoustical diaphragm 35. This diaphragm vibrated by said sound tracks, will thus convert the mechanical vibration into sound. Upon release, the button returns to its normal position.

This device will still give a correct sound on the down stroke of the sound track, but the child or user must be instructed to disregard the sound produced on the upstroke.

The sound tracks may also be comprised of Morse code symbols and the movement of the keys in one or both directions may be utilized to reproduce the desired sequence of dots and dashes.

It is apparent that this principle may be employed for not only teaching children letters, numbers or simple words, but may also be employed for students learning foreign languages.

Although a preferred form has been shown, it will be understood that similar forms within the scope of what is claimed may be made without departing from the spirit of this invention.

For example, the sound reproduced in some cases may be different from that of the visual indication, as in the case of teaching arithmetic where the visual indication would be "2×4," and the sound groove would reproduce "8."

What is claimed is:

1. An apparatus employing a plurality of manual movable keys with indicia recorded on each for reproducing a predetermining sound according to said visual indicia, a sound track attached to the shank of each key in conjunction with the visual indicia recorded on the key, a diaphragm having perforations therethrough to admit the key shank with its sound track, means to move any visual indicia and in turn its connected sound track through its associated perforation in said diaphragm so that the contacting face of said sound track reproduces a corresponding sound in the diaphragm to what is recorded on said key.

2. An apparatus employing a plurality of sound tracks in juxtaposition to a diaphragm so that each one will produce vibrations in said diaphragm when moved, words or similar characters being indicated on a plurality of keys and set up in said sound tracks, and said plurality of keys carrying said sound tracks, means to move any one button and key to reproduce a sound from that sound track that corresponds to its indicated letter, word or character.

3. An apparatus comprising the combination of a sound reproducing diaphragm with a plurality of perforations and a plurality of sound tracks, each sound track being in juxtaposition with a single perforation in said diaphragm, said sound tracks being embossed on a resiliently mounted key, each key being marked with an indicia corresponding to what is recorded on the sound track of that key, contact means in each perforation of said diaphragm to co-act with the sound track in juxtaposition therewith, and means to move any button and its connected key to produce an audible sound corresponding to the sound recorded on the sound track and the indicia recorded on said key.

ISSAC ALLEN MITCHELL.

REFERENCES CITED

The following references are of record in the file of this patent:

UNITED STATES PATENTS

| Number | Name | Date |
|---|---|---|
| 1,792,528 | Bleyer | Feb. 17, 1931 |
| 794,599 | Durand | July 11, 1905 |
| 1,465,699 | Vogt | Aug. 21, 1923 |
| 2,164,663 | Ottofy | July 4, 1939 |
| 1,812,634 | Jones | June 30, 1931 |
| 2,052,442 | Black | Aug. 25, 1936 |
| 1,276,344 | Gilman | Aug. 20, 1918 |